US010185517B2

(12) United States Patent
Cudak et al.

(10) Patent No.: US 10,185,517 B2
(45) Date of Patent: Jan. 22, 2019

(54) LIMITING THE EXECUTION OF BACKGROUND MANAGEMENT OPERATIONS IN A DRIVE ARRAY

(71) Applicant: LENOVO ENTERPRISE SOLUTIONS (SINGAPORE) PTE. LTD., Singapore (SG)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 175 days.

(21) Appl. No.: 13/795,309

(22) Filed: Mar. 12, 2013

(65) Prior Publication Data
US 2014/0215150 A1 Jul. 31, 2014

Related U.S. Application Data

(63) Continuation of application No. 13/755,280, filed on Jan. 31, 2013.

(51) Int. Cl.
*G06F 12/00* (2006.01)
*G06F 3/06* (2006.01)
*G06F 11/10* (2006.01)

(52) U.S. Cl.
CPC .......... *G06F 3/0689* (2013.01); *G06F 3/061* (2013.01); *G06F 3/0659* (2013.01);
(Continued)

(58) Field of Classification Search
CPC .......... G06F 3/061; G06F 3/0659; G06F 9/00; G06F 13/00; G06F 13/1615;
(Continued)

(56) References Cited

U.S. PATENT DOCUMENTS 5,720,025 A * 2/1998 Wilkes et al. ............... 714/6.12
6,553,511 B1 * 4/2003 DeKoning .......... G06F 11/1076
707/999.1

(Continued)

FOREIGN PATENT DOCUMENTS

CN 102122236 A 7/2011

OTHER PUBLICATIONS

Savage, S., et al., "AFRAID-A Frequently Redundant Array of Independent Disks", 1996 USENIX Technical Conference—Jan. 22-26, 1996, Location: San Diego, CA, pp. 27-39, USENIX Association, Berkeley, CA, USA.
(Continued)

*Primary Examiner* — Tracy A Warren
(74) *Attorney, Agent, or Firm* — Brandon C. Kennedy; Jason A. Friday; Kennedy Lenart Spraggins LLP

(57) ABSTRACT

Limiting the execution of background management operations in a drive array, including: receiving a read instruction to read data from a memory drive in the drive array; determining whether the read instruction is associated with a write instruction to write data to a memory drive in the drive array; responsive to determining that the read instruction is associated with the write instruction, restricting performance of background management operations on the memory drive targeted by the write instruction; determining whether the write instruction has completed; and responsive to determining that the write instruction has completed, removing restrictions associated with the performance of background management operations on the memory drive targeted by the write instruction.

12 Claims, 3 Drawing Sheets

(52) U.S. Cl.
CPC ......... *G06F 11/1076* (2013.01); *G06F 12/00* (2013.01); *G06F 2211/104* (2013.01); *G06F 2211/1059* (2013.01)

(58) Field of Classification Search
CPC .... G06F 13/1688; G06F 13/18; G06F 13/161; G06F 13/1652; G06F 13/1689; G06F 13/225; G06F 13/24; G06F 13/26; G06F 13/28; G06F 13/1642
USPC .......................................... 711/147, 154, 167
See application file for complete search history.

(56) References Cited

U.S. PATENT DOCUMENTS

| | | | |
|---|---|---|---|
| 7,373,444 | B2 | 5/2008 | Asano et al. |
| 7,668,810 | B2 | 2/2010 | Davis et al. |
| 8,219,745 | B2 | 7/2012 | Bellows et al. |
| 8,250,283 | B1 | 8/2012 | Lee et al. |
| 8,275,951 | B2 | 9/2012 | Andruszkiewicz et al. |
| 8,688,660 | B1 * | 4/2014 | Sivasubramanian ........................ G06F 3/0619 707/703 |
| 2009/0328229 | A1 * | 12/2009 | Fashchik ............. G06F 11/2056 726/26 |
| 2011/0246717 | A1 | 10/2011 | Kobayashi et al. |
| 2011/0289256 | A1 | 11/2011 | Bartlett |
| 2011/0302374 | A1 | 12/2011 | Cantin et al. |
| 2012/0195192 | A1 | 8/2012 | Matthews et al. |
| 2012/0221922 | A1 | 8/2012 | Bennett |
| 2012/0233406 | A1 | 9/2012 | Igashira et al. |

OTHER PUBLICATIONS

Li, D., et al., "ERRAID: Energy Efficient Redundant and Inexpensive Disk Array", Proceedings of the 11th Workshop on ACM SIGOPS European workshop, 2004, pp. 1-6, Series EW 11, Article 29, ACM, New York, NY, USA, DOI=10.1145/1133572.1133577.

Wikipedia, "Read-modify-write—Wikipedia, the free encyclopedia", http://en.wikipedia.org/wiki/Read-modify-write, accessed Jan. 4, 2013, 1 page.

Slashdot, "Wear Leveling, RAID Can Wipe Out SSD Advantage—Slashdot", Slashdot.org (online), accessed Jan. 4, 2013, 34 pages, URL: http://hardware.slashdot.org/story/10/03/06/1650232/wear-leveling-raid-can-wipe-out-ssd-advantage.

PCT Search Report and Written Opinion, PCT Application No. PCT/IB2014/058113, dated Apr. 23, 2014, pp. 1-11.

Islam Chisty et al., "Java Annotations: An Introduction", Developer. com, Oct. 14, 2005, 8 pages, http://www.developer.com/java/other/article.php/35561 76/ An-Introduction-to-Java-An notations. htm.

* cited by examiner

US 10,185,517 B2

LIMITING THE EXECUTION OF BACKGROUND MANAGEMENT OPERATIONS IN A DRIVE ARRAY

CROSS-REFERENCE TO RELATED APPLICATION

This application is a continuation application of and claims priority from U.S. patent application Ser. No. 13/755,280, filed on Jan. 31, 2013.

BACKGROUND OF THE INVENTION

Field of the Invention

The field of the invention is data processing, or, more specifically, methods, apparatus, and products for limiting the execution of background management operations in a drive array.

Description of Related Art

Storage systems can be embodied as a redundant array of independent disks (RAID') that are controlled by a RAID controller. RAID controllers protect data by adding parity protection over a group of independent storage devices. Parity calculations require the RAID controller to use a number of reads and writes that are in some cases dependent on one another to keep the drive group coherent. The parity calculations on a RAID array require data from multiple sources and writes will have to wait for a series of reads and these parity calculations to complete. Individual devices can interpret the pause in activity as an opportunity to perform background tasks such as data scrubbing or consistency checking, which can hurt write performance on the storage array.

SUMMARY OF THE INVENTION

Methods, apparatus, and products for limiting the execution of background management operations in a drive array, including: receiving, by a drive array controller, a read instruction to read data from a memory drive in the drive array; determining, by the drive array controller, whether the read instruction is associated with a write instruction to write data to a memory drive in the drive array; responsive to determining, by the drive array controller, that the read instruction is associated with the write instruction, restricting, by the drive array controller, performance of background management operations on the memory drive targeted by the write instruction; determining, by the drive array controller, whether the write instruction has completed; and responsive to determining, by the drive array controller, that the write instruction has completed, removing, by the drive array controller, restrictions associated with the performance of background management operations on the memory drive targeted by the write instruction.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
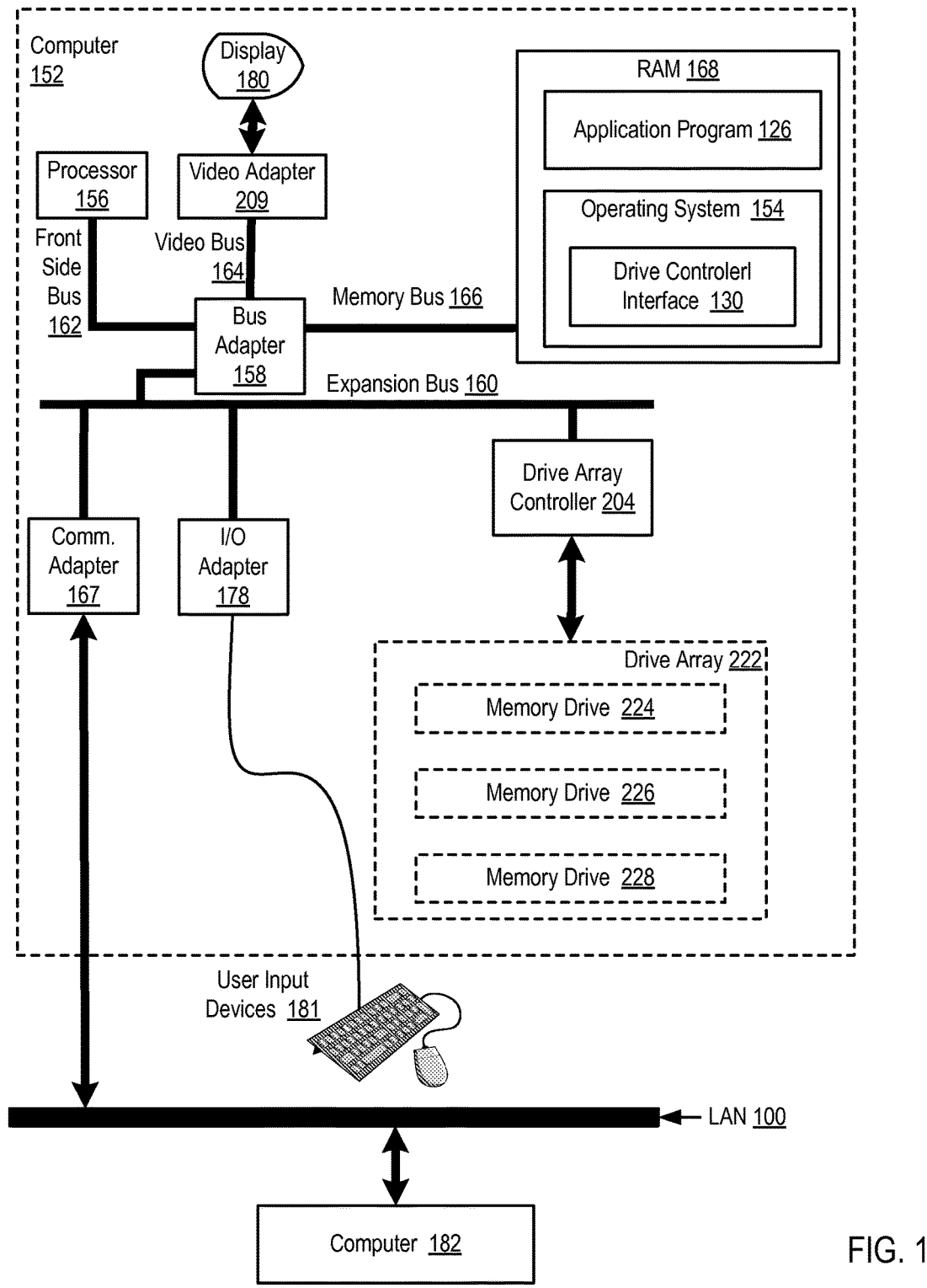
FIG. 1 sets forth a block diagram of automated computing machinery comprising an example computer useful in limiting the execution of background management operations in a drive array according to embodiments of the present invention.

Example methods, apparatus, and products for limiting the execution of background management operations in a drive array in accordance with the present invention are described with reference to the accompanying drawings, beginning with FIG. 1. FIG. 1 sets forth a block diagram of automated computing machinery comprising an example computer (152) useful in limiting the execution of background management operations in a drive array according to embodiments of the present invention. The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

Stored in RAM (168) is an application program (126), a module of user-level computer program instructions for carrying out particular data processing tasks on the computer (152). Examples of such application programs include spreadsheets, word processing programs, email clients, web browsers, database management programs, and so on. Also stored in RAM is a drive controller interface (130), a module of computer program instructions that provides an application programming interface or 'API' through which the application program (126) can communicate with a drive array controller (204), such as a redundant array of independent disks (RAID') controller, for writing and reading data to and from one or more memory drives (224, 226, 228) in a drive array (222).

Also stored in RAM (168) is an operating system (154). Operating systems useful limiting the execution of background management operations in a drive array according to embodiments of the present invention include UNIX™, Linux™, Microsoft XP™, AIX™, IBM's i5/OS™, and others as will occur to those of skill in the art. The operating system (154), application program (126), and drive controller interface (130) in the example of FIG. 1 are shown in RAM (168), but many components of such software typically are stored in non-volatile memory also, such as, for example, on a memory drive.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for limiting the execution of background management operations in a drive array according to embodiments of the present invention include modems for wired dial-up communications, Ethernet (IEEE 802.3) adapters for wired data communications network communications, and 802.11 adapters for wireless data communications network communications.

The example computer of FIG. 1 also includes a drive array controller (204) coupled through an expansion bus (160) and a bus adapter (158) to a processor (156) and other components of the computer (152). The drive array controller (204) is a computer input/output adapter that connects non-volatile data storage to the computer (152) in the form of memory drives (224, 226, 228). The drive array controller (204) of FIG. 1 administers read and write requests to and from memory drives (224, 226, 228).

In the example of FIG. 1, the drive array controller (204) can carry out limiting the execution of background management operations in a drive array (222) by receiving a read instruction to read data from a first memory drive (224) in a drive array (222). The read instruction may be received from the computer processor (156) that sends the read instruction to the drive array controller (204) over a memory bus. Such a read instruction may be part of a larger memory management operation such as, for example, performing parity calculations for memory drives (224, 226, 228) in the drive array (222).

In the example of FIG. 1, the drive array controller (204) can further carry out limiting the execution of background management operations in a drive array (222) by determining whether the read instruction is associated with a write instruction to write data to a second memory drive (226) in the drive array (222). Determining whether the read instruction is associated with a write instruction to write data to a second memory drive (226) in the drive array (222) may be carried out, for example, through the use of flags that are contained in the read instruction (202), through the use of flags that are contained in the data that is to be read as a result of the read instruction (202), and so on.

Consider an example in which the drive array (222) is a RAID 5 compliant array. In such an example, performing parity calculations for the drive array (222) can include reading data from a plurality of memory drives (224, 228), using the data that was read from the memory drives (224, 228) as input to an exclusive OR operation, and subsequently writing the result of the exclusive OR operation to another memory drive (226) that is responsible for maintaining parity information for a particular portion of the memory drives (224, 228). In such an example, a read instruction would be issued to memory drive (224) and another read instruction would be issued to memory drive (228). Each read instruction would be associated with a write instruction that will be issued to memory drive (226) upon the completion of the exclusive OR operation. As such, even though memory drive (226) may not be actively servicing any memory access requests, the issuance of a read instruction to memory drive (224) and another read instruction to memory drive (228) as part of parity calculations would serve as an indication that memory drive (226) will be servicing a memory access request—writing the result of the exclusive OR operation to the memory drive (226)—in the near future.

In the example of FIG. 1, the drive array controller (204) can further carry out limiting the execution of background management operations in a drive array (222) by restricting performance of background management operations on the second memory drive (226) in the drive array (222). Restricting performance of background management operations on the second memory drive (226) in the drive array (222) is carried out in response to affirmatively determining that the read instruction is associated with the write instruction. Background management operations can include data scrubbing operations, consistency checking, and other management operations that are frequently run as background tasks to ensure proper operation of the memory drives (224, 226, 228). A particular operation may be identified as being a background management operation, for example, as part of configuring a computing system, as the result of input from a system administrator, and so on. Such background operations are typically executed through the use of a background process that is running in the background without user intervention.

When a particular memory drive (224, 226, 228) is servicing memory access requests that are performed as part of background management operations, the memory drive (224, 226, 228) will have less capacity to service memory access requests that are performed as the result of normal computing operations. The memory drive (224, 226, 228) may have less capacity to service memory access requests that are performed as the result of normal computing operations because resources required to service memory access requests that are performed as part of background management operations are being dedicated to the execution of the background management operations. As such, the performance of background management operations on the second memory drive (226) in the drive array (222) may be restricted in anticipation of servicing the write instruction that is related to the read instruction. Restricting the performance of background management operations on the second memory drive (226) in the drive array (222) can include, for example, limiting the percentage of memory access requests that the second memory drive (226) may service as part of performing background management operations to a predetermined threshold.

In the example of FIG. 1, the drive array controller (204) can further carry out limiting the execution of background management operations in a drive array (222) by receiving the write instruction. The write instruction may be issued to the drive array controller (204), for example, by the computer processor (156) over a memory bus. Such a write instruction may be part of a larger memory management operation such as, for example, performing parity calculations for memory drives (224, 226, 228) in the drive array (222).

In the example of FIG. 1, the drive array controller (204) can further carry out limiting the execution of background management operations in a drive array (222) by determining whether the write instruction has completed. Determining whether the write instruction has completed may be carried out, for example, by inspecting each completed write instruction that the drive array controller (204) causes to execute. In such an example, each completed write instruction may be examined to determine whether the executed write instruction is the same write instruction that is related to the read instruction. In order to determine whether a particular executed write instruction is the same write instruction that is related to the read instruction, the read instruction and the write instruction may include metadata that identifies the two instructions as being related. Such metadata may include, for example, an identifier that includes a unique value that is included in metadata associated with the read instruction and also included in metadata associated with the write instruction. In such an example, when the drive array controller (204) receives a read instruction that has a related write instruction, the drive array controller (204) may store the unique identifier contained in the read instruction. This value may be compared against values contained in metadata associated with incoming write instructions to identify the write instruction that includes a matching unique identifier.

Consider the example described above in which the drive array (222) is a RAID 5 compliant array. Performing parity calculations for the drive array (222) can therefore include reading data from a plurality of memory drives (224, 228), using the data that was read from the memory drives (224, 228) as input to an exclusive OR operation, and subsequently writing the result of the exclusive OR operation to another memory drive (226) that is responsible for maintaining parity information for a particular portion of the memory drives (224, 228). In such an example, the read instruction that is issued to memory drive (224) and read instruction that is issued to memory drive (228) may include metadata identifying these read instructions as being related to a write instruction that has not yet been issued. Each read instruction can also include a particular value that is to be used as an identifier of the group of instructions. This value can be stored in memory used by the drive array controller (204). When the drive array controller (204) subsequently receives an incoming write instruction, the drive array controller (204) may examine the metadata associated with the incoming write instruction to determine whether the metadata associated with the incoming write instruction includes a value that matches the value that was that includes in the read instruction that is issued to memory drive (224) and read instruction that is issued to memory drive (228). If the values match, the incoming write instruction represents that related write instruction that was identified in the read instruction that is issued to memory drive (224) and read instruction that is issued to memory drive (228). Once the related write instruction is executed, there is no longer a need to restrict the performance of background management operations on the memory drive (226) targeted by the write operation.

In the example of FIG. 1, the drive array controller (204) can further carry out limiting the execution of background management operations in a drive array (222) by removing the restrictions associated with the performance of background management operations on the second memory drive (226) in the drive array (222). Removing the restrictions associated with the performance of background management operations on the second memory drive (226) in the drive array (222) is carried out in response to affirmatively determining that the write instruction has completed. Removing the restrictions associated with the performance of background management operations on the second memory drive (226) in the drive array (222) may be carried out, for example, by removing any limitations as to the percentage of memory access requests that the second memory drive (226) may service as part of performing background management operations, by increasing the percentage of memory access requests that the second memory drive (226) may service as part of performing background management operations, and so on.

Figure 2:
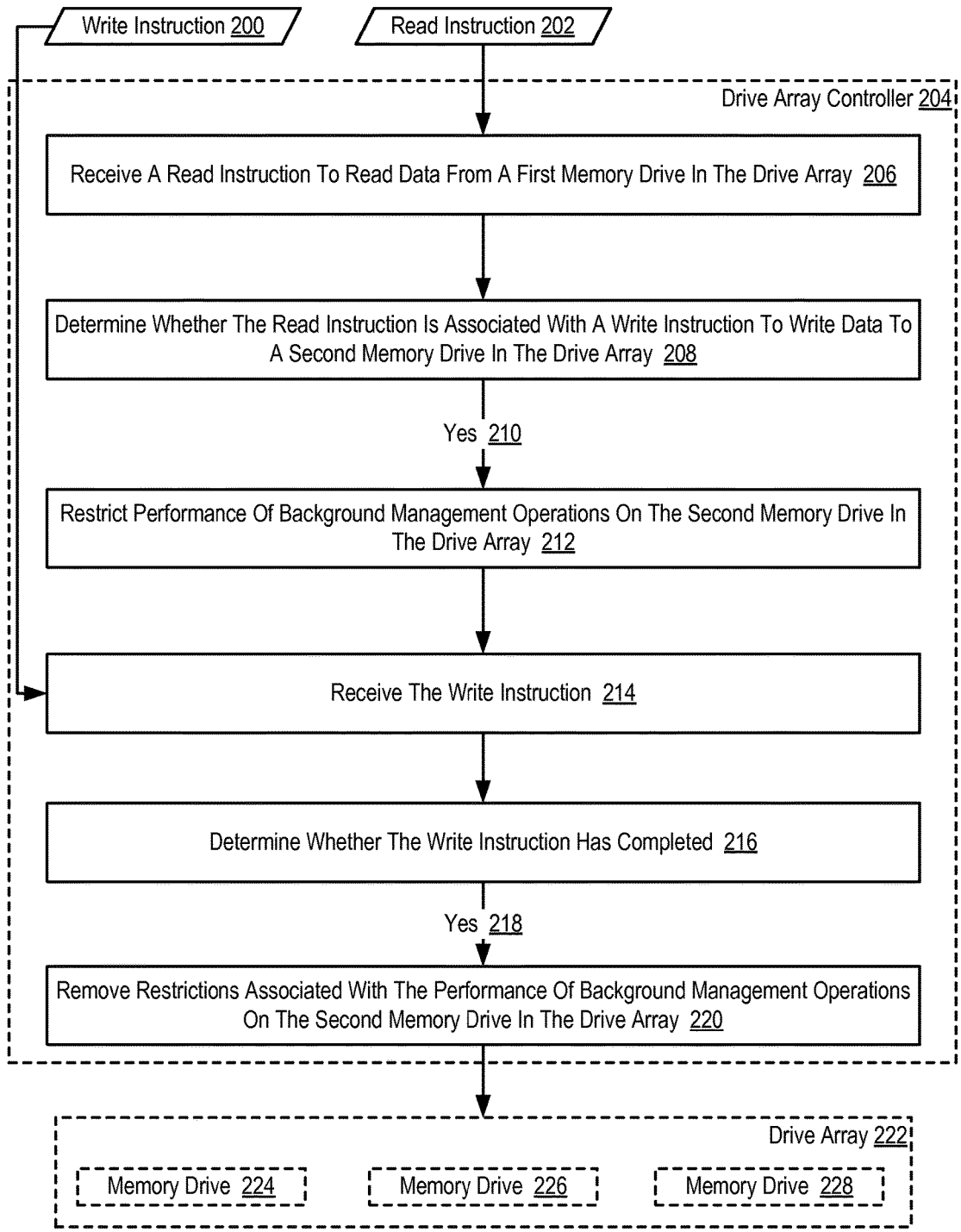
FIG. 2 sets forth a flow chart illustrating an example method for limiting the execution of background management operations in a drive array according to embodiments of the present invention.

For further explanation, FIG. 2 sets forth a flow chart illustrating an example method for limiting the execution of background management operations in a drive array (222) according to embodiments of the present invention. The drive array (222) of FIG. 2 includes a plurality of memory drives (224, 226, 228). Each memory drive (224, 226, 228) may be embodied as a distinct computer storage device such as, for example, a disk drive, a solid state drive, and so on. The memory drives (224, 226, 228) are pooled together to create a drive array (222) which is a storage system that contains multiple memory drives to provide increased availability and resiliency through the use of redundant components. The drive array (222) of FIG. 2 may be embodied, for example, as a redundant array of independent disks (RAID'). Such a RAID may adhere to standard RAID levels such as RAID 5 in which parity and data are distributed amongst the memory drives (224, 226, 228).

The example method of FIG. 2 is carried out by a drive array controller (204). The drive array controller (204) of FIG. 2 may be embodied as a device to manage the drive array (222), including the memory drives (224, 226, 228) that form the drive array (222). For example, the drive array controller (204) of FIG. 2 may be embodied as a RAID controller which manages the physical memory drives (224, 226, 228) of a RAID and presents them to a computing device as logical units.

The example method of FIG. 2 includes receiving (206), by the drive array controller (204), a read instruction (202) to read data from a first memory drive (224) in a drive array (222). In the example method of FIG. 2, the read instruction (202) may be received from a computer processor (not shown) that sends the read instruction (202) to the drive array controller (204) over a memory bus. Such a read instruction (202) may be part of a larger memory management operation such as, for example, performing parity calculations for memory drives (224, 226, 228) in the drive array (222).

The example method of FIG. 2 also includes determining (208), by the drive array controller (204), whether the read instruction (202) is associated with a write instruction (200) to write data to a second memory drive (226) in the drive array (222). In the example method of FIG. 2, determining (208) whether the read instruction (202) is associated with a write instruction (200) to write data to a second memory drive (226) in the drive array (222) may be carried out, for example, through the use of flags that are contained in the read instruction (202), through the use of flags that are contained in the data that is to be read as a result of the read instruction (202), and so on. For example, the read instruction (202) may include metadata that is associated with the read instruction (202). Such metadata may include, for example, an integer value that is set by the issuer of the read instruction (202) to identify whether the read instruction (202) is associated with a write instruction (200) to write data to a second memory drive (226) in the drive array (222). A value of 0 may indicate that the read instruction (202) is not associated with a write instruction (200) to write data to a second memory drive (226) in the drive array (222), while a value of 1 may indicate that the read instruction (202) is associated with a write instruction (200) to write data to a second memory drive (226) in the drive array (222). In such an example, the drive array controller (204) may read the values contained in such flags to determine (208) whether the read instruction (202) is associated with a write instruction (200) to write data to a second memory drive (226) in the drive array (222).

Readers will appreciate in the example method of FIG. 2, the write instruction (200) that is associated with the read instruction (202) may not yet have been issued at the time it was determined (208) that the read instruction (202) is associated with a write instruction (200) to write data to a second memory drive (226) in the drive array (222). That is, the issuer of the read instruction (202) may know, at the time that the read instruction (202) is issued, that the read instruction (202) is just one memory access request in a series of memory access requests that will involve issuing a write instruction (200) to write data to a second memory drive (226) in the drive array (222) at a later time.

Consider the example described above in which the drive array (222) is a RAID 5 compliant array. In such an example, performing parity calculations for the drive array (222) can include reading data from a plurality of memory drives (224, 228), using the data that was read from the memory drives (224, 228) as input to an exclusive OR operation, and subsequently writing the result of the exclusive OR operation to another memory drive (226) that is responsible for maintaining parity information for a particular portion of the memory drives (224, 228). In such an example, a read instruction would be issued to memory drive (224) and another read instruction would be issued to memory drive (228). Each read instruction would be associated with a write instruction that will be issued to memory drive (226) upon the completion of the exclusive OR operation. As such, even though memory drive (226) may not be actively servicing any memory access requests, the issuance of a read instruction to memory drive (224) and another read instruction to memory drive (228) as part of parity calculations would serve as an indication that memory drive (226) will be servicing a memory access request—writing the result of the exclusive OR operation to the memory drive (226)—in the near future.

The example method of FIG. 2 also includes restricting (212), by the drive array controller (204), performance of background management operations on the second memory drive (226) in the drive array (222). In the example method of FIG. 2, restricting (212) performance of background management operations on the second memory drive (226) in the drive array (222) is carried out in response to affirmatively (210) determining that the read instruction (202) is associated with the write instruction (200). In the example method of FIG. 2, background management operations can include data scrubbing operations, consistency checking, and other management operations that are frequently run as background tasks to ensure proper operation of the memory drives (224, 226, 228). A particular operation may be identified as being a background management operation, for example, as part of configuring a computing system, as the result of input from a system administrator, and so on. Such background operations are typically executed through the use of a background process that is running in the background without user intervention.

When a particular memory drive (224, 226, 228) is servicing memory access requests that are performed as part of background management operations, the memory drive (224, 226, 228) will have less capacity to service memory access requests that are performed as the result of normal computing operations. The memory drive (224, 226, 228) may have less capacity to service memory access requests that are performed as the result of normal computing operations because resources required to service memory access requests that are performed as part of background management operations are being dedicated to the execution of the background management operations. As such, the performance of background management operations on the second memory drive (226) in the drive array (222) may be restricted (212) in anticipation of servicing the write instruction (200) that is related to the read instruction (202). Restricting (212) the performance of background management operations on the second memory drive (226) in the drive array (222) can include, for example, limiting the percentage of memory access requests that the second memory drive (226) may service as part of performing background management operations to a predetermined threshold.

The example method of FIG. 2 also includes receiving (214), by the drive array controller (204), the write instruction (200). In the example method of FIG. 2, the write instruction (200) may be issued to the drive array controller (204), for example, by a computer processor (not shown) over a memory bus. Such a write instruction (200) may be part of a larger memory management operation such as, for example, performing parity calculations for memory drives (224, 226, 228) in the drive array (222).

The example method of FIG. 2 also includes determining (216), by the drive array controller (204), whether the write instruction (200) has completed. In the example method of FIG. 2, determining (216) whether the write instruction (200) has completed may be carried out, for example, by inspecting each completed write instruction that the drive array controller (204) causes to execute. In such an example, each completed write instruction may be examined to determine whether the executed write instruction is the same write instruction (200) that is related to the read instruction (202). In order to determine whether a particular executed write instruction is the same write instruction (200) that is related to the read instruction (202), the read instruction (202) and the write instruction (200) may include metadata that identifies the two instructions as being related. Such metadata may include, for example, an identifier that includes a unique value that is included in metadata associated with the read instruction (202) and also included in metadata associated with the write instruction (202). In such an example, when the drive array controller (204) receives a read instruction (202) that has a related write instruction (200), the drive array controller (204) may store the unique identifier contained in the read instruction (202). This value may be compared against values contained in metadata associated with incoming write instructions to identify the write instruction (202) that includes a matching unique identifier.

Consider the example described above in which the drive array (222) is a RAID 5 compliant array. Performing parity calculations for the drive array (222) can therefore include reading data from a plurality of memory drives (224, 228), using the data that was read from the memory drives (224, 228) as input to an exclusive OR operation, and subsequently writing the result of the exclusive OR operation to another memory drive (226) that is responsible for maintaining parity information for a particular portion of the memory drives (224, 228). In such an example, the read instruction that is issued to memory drive (224) and read instruction that is issued to memory drive (228) may include metadata identifying these read instructions as being related to a write instruction that has not yet been issued. Each read instruction can also include a particular value that is to be used as an identifier of the group of instructions. This value can be stored in memory used by the drive array controller (204). When the drive array controller (204) subsequently receives an incoming write instruction, the drive array controller (204) may examine the metadata associated with the incoming write instruction to determine whether the metadata associated with the incoming write instruction includes a value that matches the value that was that includes in the read instruction that is issued to memory drive (224) and read instruction that is issued to memory drive (228). If the values match, the incoming write instruction represents that related write instruction that was identified in the read instruction that is issued to memory drive (224) and read instruction that is issued to memory drive (228). Once the related write instruction is executed, there is no longer a need to restrict the performance of background management operations on the memory drive (226) targeted by the write operation.

The example method of FIG. 2 also includes removing (220), by the drive array controller (204), the restrictions associated with the performance of background management operations on the second memory drive (226) in the drive array (222).

In the example method of FIG. 2, removing (220) the restrictions associated with the performance of background management operations on the second memory drive (226) in the drive array (222) is carried out in response to affirmatively (218) determining that the write instruction (200) has completed. Removing (220) the restrictions associated with the performance of background management operations on the second memory drive (226) in the drive array (222) may be carried out, for example, by removing any limitations as to the percentage of memory access requests that the second memory drive (226) may service as part of performing background management operations, by increasing the percentage of memory access requests that the second memory drive (226) may service as part of performing background management operations, and so on.

Figure 3:
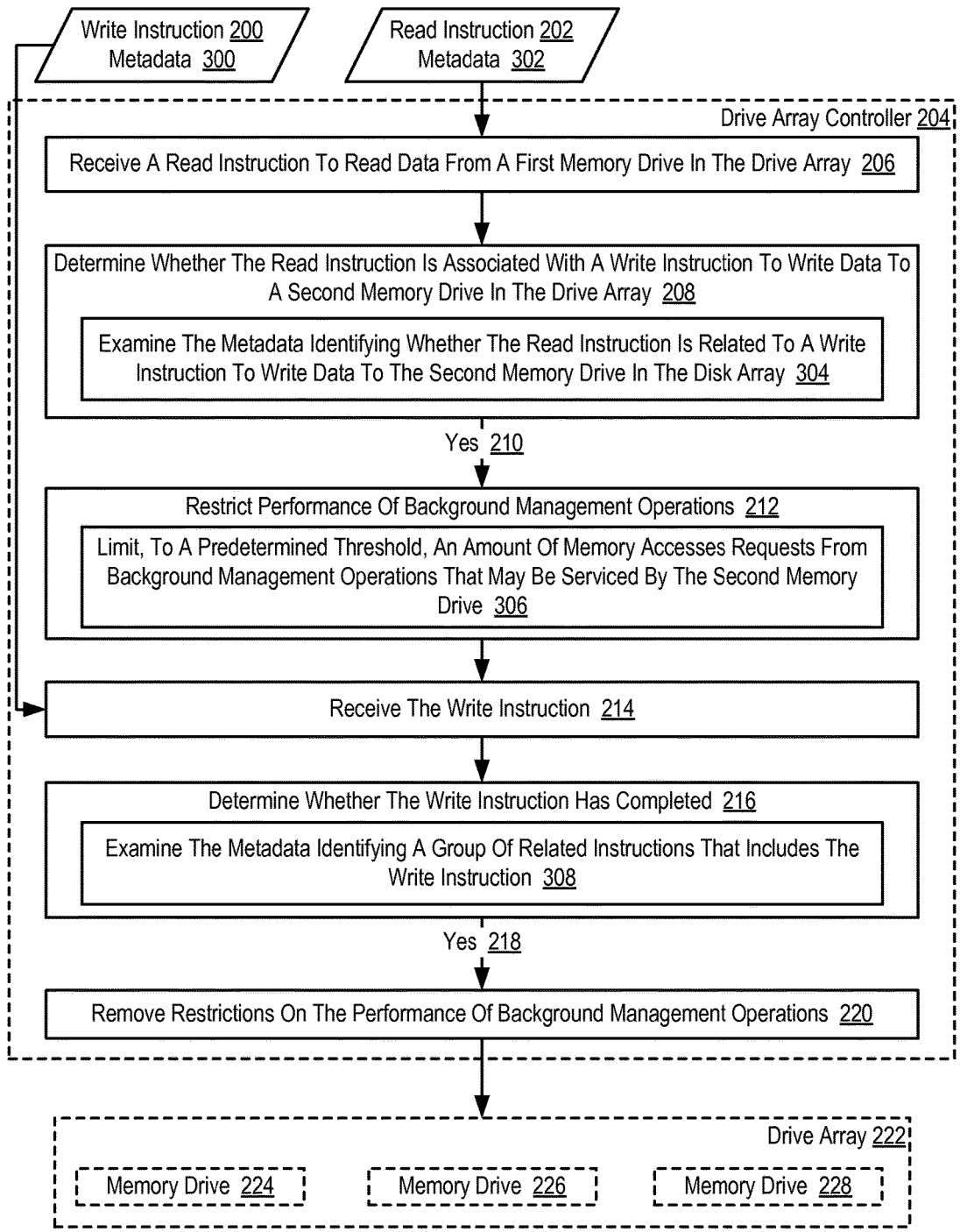
FIG. 3 sets forth a flow chart illustrating an additional example method for limiting the execution of background management operations in a drive array according to embodiments of the present invention.

For further explanation, FIG. 3 sets forth a flow chart illustrating an additional example method for limiting the execution of background management operations in a memory device according to embodiments of the present invention. The example method of FIG. 3 is similar to the example method of FIG. 2, as it also includes receiving (206) a read instruction (202) to read data from a first memory drive (224) in a drive array (222), determining (208) whether the read instruction (202) is associated with a write instruction (200) to write data to a second memory drive (226) in the drive array (222), restricting (212) performance of background management operations on the second memory drive (226) in the drive array (222), receiving (214) the write instruction (200), determining (216) whether the write instruction (200) has completed, and removing (220) the restrictions associated with the performance of background management operations on the second memory drive (226) in the drive array (222).

In the example method of FIG. 3, the read instruction (202) includes metadata (302) identifying whether the read instruction (302) is related to a write instruction (200) to write data to the second memory drive (226) in the drive array (222). The metadata (302) of FIG. 3 may include, for example, a value indicating that the read instruction (302) has an associated dependent write instruction (200), an identifier with a value that identifies the related set of instructions such that the same value will be included in metadata included in the dependent write instruction (200), and so on. In the example method of FIG. 3, determining (208) whether the read instruction (202) is associated with a write instruction (200) to write data to the memory device (222) can therefore include examining (304), by the drive array controller (204), the metadata (302) identifying whether the read instruction (202) is related to a write instruction (200) to write data to the memory device (222).

In the example method of FIG. 3, restricting (212) performance of background management operations on the memory device (222) includes limiting (306), to a predetermined threshold, an amount of memory accesses requests from background management operations that may be serviced by the second memory drive (226). In the method of FIG. 3, the predetermined threshold may be specified in terms of an amount of memory accesses requests from background management operations that the second memory drive (226) may service in a predetermined period of time, a maximum percentage of all memory accesses requests that are serviced by the second memory drive (226) that can originate from background management operations, and so on. In the example method of FIG. 3, the drive array controller (204) may simply ignore or reject any memory access requests that are directed to the second memory drive (226) that exceed the predetermined threshold. In such a way, the drive array controller (204) may ensure that the second memory drive (226) is not servicing background management operations to an extent that will cause an unnecessary delay in processing the write instruction (200).

In the example method of FIG. 3, the write instruction (200) includes metadata (300) identifying a group of related instructions that includes the write instruction (200). The metadata (300) of FIG. 3 may include, for example, a value indicating that the write instruction (300) is part of a group of instructions that includes one or more associated read instructions (202) that the write instruction (300) is dependent upon, an identifier with a value that identifies a specific group of related instructions such that the same value will be included in metadata included in the one or more related read instructions (202), and so on.

In the example method of FIG. 3, determining (216) whether the write instruction (200) has completed can include examining (308), by the drive array controller (204), the metadata (300) identifying a group of related instructions that includes the write instruction (200). In the example method of FIG. 3, examining (308) the metadata (300) identifying a group of related instructions that includes the write instruction (200) may be carried out, for example, by inspecting each completed write instruction that the drive array controller (204) causes to execute. In such an example, each completed write instruction may be examined (308) to determine whether the write instruction (200) is part of a group of related instructions that includes the read instruction (202). In order to determine the write instruction (200) is part of a group of related instructions that includes the read instruction (202), the metadata (300) contained in the write instruction (200) may be compared to the metadata (302) contained in the read instruction (202) to identify a match. In such an example, when the drive array controller (204) receives a read instruction (202) that has a related write instruction (200), the drive array controller (204) may store the unique identifier contained in the read instruction (202). This value may be compared against values contained in metadata associated with incoming write instructions to identify the write instruction (202) that includes a matching unique identifier.

Although the examples described above describe embodiments in which data is read from a first memory drive and written to a second memory drive, readers will appreciate data may be read from and written to the same memory drive according to embodiments of the present invention. The description of embodiments in which data is read from a first memory drive and written to a second memory drive is included for ease of explanation and should not be read to limit the scope of the present claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   by computer program instructions of a computing device, determining whether a first instruction is associated with a second instruction of a parity calculation operation from first metadata received with the first instruction of the parity calculation operation, wherein the first instruction comprises an instruction to read data from a first memory drive in a drive array, wherein the first instruction comprises the first metadata, the first metadata specifying that said first instruction is associated with the second instruction of the parity calculation operation by using a flag bit to indicate that the first instruction is related to the second instruction and that the second instruction is dependent on the first instruction, wherein the second instruction comprises an instruction to write data to a second memory drive in the drive array;

responsive to determining that said first instruction is associated with said second instruction to write data to the second memory drive, placing restrictions on the performance of background management operations on the second memory drive to a predetermined threshold, the background management operations comprising memory access requests to the second memory drive that are unrelated to the parity calculation operation, wherein the predetermined threshold is specified as an amount of background management operation memory access requests that the second memory drive services in a predetermined period of time, prior to receiving said second instruction, in an environment where the performance of background management operations on the second memory drive exceeds the predetermined threshold, wherein the second instruction includes second metadata identifying a group of related instructions to read that the second instruction is dependent upon, wherein restricting the performance of the background management operations on the second memory drive includes rejecting background management operation memory access requests on the second memory drive that exceed the predetermined threshold;

determining that the second instruction has completed; and responsive to determining that the second instruction has completed, removing the restrictions on the performance of background management operations on the second memory drive.

2. The method of claim 1 wherein determining from first metadata received with a first instruction to read data from a first memory drive in a drive array that said first instruction is associated with a second instruction to write data to a second memory drive in the drive array includes examining the first metadata identifying whether said first instruction is related to said second instruction.

3. The method of claim 1 wherein determining whether the second instruction has completed includes examining the second metadata identifying a group of related instructions to read that the second instruction is dependent upon.

4. The method of claim 1 wherein determining whether the first instruction is associated with the second instruction includes determining that the first metadata for the first instruction and the second metadata for the second instruction both include a matching unique value.

5. An apparatus comprising a computer processor and a computer memory operatively coupled to the computer processor, the computer memory having disposed within it computer program instructions that, when executed, cause the apparatus to carry out the steps of:

determining whether a first instruction is associated with a second instruction of a parity calculation operation from first metadata received with the first instruction of the parity calculation operation, wherein the first instruction comprises an instruction to read data from a first memory drive in a drive array, wherein the first instruction comprises the first metadata, the first metadata specifying that said first instruction is associated with the second instruction of the parity calculation operation by using a flag bit to indicate that the first instruction is related to the second instruction and that the second instruction is dependent on the first instruction, wherein the second instruction comprises an instruction to write data to a second memory drive in the drive array;

responsive to determining that said first instruction is associated with said second instruction to write data to the second memory drive, placing restrictions on the performance of background management operations on the second memory drive to a predetermined threshold, the background management operations comprising memory access requests to the second memory drive that are unrelated to the parity calculation operation, wherein the predetermined threshold is specified as an amount of background management operation memory access requests that the second memory drive services in a predetermined period of time, prior to receiving said second instruction, in an environment where the performance of background management operations on the second memory drive exceeds the predetermined threshold, wherein the second instruction includes second metadata identifying a group of related instructions to read that the second instruction is dependent upon, wherein restricting the performance of the background management operations on the second memory drive includes rejecting background management operation memory access requests on the second memory drive that exceed the predetermined threshold;

determining that the second instruction has completed; and responsive to determining that the second instruction has completed, removing the restrictions on the performance of background management operations on the second memory drive.

6. The apparatus of claim 5 wherein determining from first metadata received with a first instruction to read data from a first memory drive in a drive array that said first instruction is associated with a second instruction to write data to a second memory drive in the drive array includes examining the first metadata identifying whether said first instruction is related to said second instruction.

7. The apparatus of claim 5 wherein determining whether the second instruction has completed includes examining the second metadata identifying a group of related instructions to read that the second instruction is dependent upon.

8. The apparatus of claim 5 wherein determining whether the first instruction is associated with the second instruction includes determining that the first metadata for the first instruction and the second metadata for the second instruction both include a matching unique value.

9. A computer program product including a computer readable storage medium, wherein the computer readable storage medium is not a signal, the computer program product comprising computer program instructions that, when executed, cause a computer to carry out the steps of:

determining whether a first instruction is associated with a second instruction of a parity calculation operation from first metadata received with the first instruction of the parity calculation operation, wherein the first instruction comprises an instruction to read data from a first memory drive in a drive array, wherein the first instruction comprises the first metadata, the first metadata specifying that said first instruction is associated with the second instruction of the parity calculation operation by using a flag bit to indicate that the first instruction is related to the second instruction and that the second instruction is dependent on the first instruction, wherein the second instruction comprises an instruction to write data to a second memory drive in the drive array;

responsive to determining that said first instruction is associated with said second instruction to write data to the second memory drive, placing restrictions on the performance of background management operations on the second memory drive to a predetermined threshold, the background management operations comprising memory access requests to the second memory drive that are unrelated to the parity calculation operation, wherein the predetermined threshold is specified as an amount of background management operation memory access requests that the second memory drive services in a predetermined period of time, prior to receiving said second instruction, in an environment where the performance of background management operations on the second memory drive exceeds the predetermined threshold, wherein the second instruction includes second metadata identifying a group of related instructions to read that the second instruction is dependent upon, wherein restricting the performance of the background management operations on the second memory drive includes rejecting background management operation memory access requests on the second memory drive that exceed the predetermined threshold;

determining that the second instruction has completed; and responsive to determining that the second instruction has completed, removing the restrictions on the performance of background management operations on the second memory drive.

10. The computer program product of claim 9 wherein determining from first metadata received with a first instruction to read data from a first memory drive in a drive array that said first instruction is associated with a second instruction to write data to a second memory drive in the drive array includes examining the first metadata identifying whether said first instruction is related to said second instruction.

11. The computer program product of claim 9 wherein determining whether the second instruction has completed includes examining the second metadata identifying a group of related instructions to read that the second instruction is dependent upon.

12. The computer program product of claim 9 wherein determining whether the first instruction is associated with the second instruction includes determining that the first metadata for the first instruction and the second metadata for the second instruction both include a matching unique value.

\* \* \* \* \*